Nov. 23, 1965     E. B. BREWSTER     3,219,819
METHOD OF THERMOGRAPHIC REPRODUCTION WITH THE
USE OF AN INFRARED RADIATION FILTER
Original Filed Oct. 16, 1961

INVENTOR.
ERNEST B. BREWSTER
BY
ATTORNEY

United States Patent Office 3,219,819
Patented Nov. 23, 1965

3,219,819
METHOD OF THERMOGRAPHIC REPRODUCTION WITH THE USE OF AN INFRARED RADIATION FILTER
Ernest B. Brewster, 191 Old Mill Road, Rochester, N.Y.
Continuation of application Ser. No. 145,188, Oct. 16, 1961. This application Feb. 17, 1964, Ser. No. 346,374
1 Claim. (Cl. 250—65)

This invention relates to infra-red transparent, thermally non-conductive sheet material for use in thermal copying processes and more partciularly relates to thermoplastic overlay sheets for use in thermal copying processes to improve facsimile copying by means of infra-red copying machines.

This application is a continuation of application Serial No. 145,188, filed October 16, 1961, having the same title, now abandoned.

Facsimile copies of infra-red absorbing indicia can be provided by overlaying an indicia-bearing sheet with a sheet of thermally sensitive copying paper and exposing the assembled indicia-bearing sheet and copying paper to infra-red radiation until the areas of the thermally sensitive copying sheet adjacent the indicia on the indicia-bearing sheet are darkened by conduction of heat from the indicia. The indicia material is more absorptive of infra-red radiation and therefore attains a higher temperature during infra-red exposure than the sheet material on which the indicia are printed, and heat transfer from the indicia to the overlay sheet is operably greater than from the sheet material on which the indicia are printed to the copying sheet. The order of assembling the indicia-bearing sheet and the copying sheet may be reversed without substantially affecting the process. Such processes are disclosed in United States Patents 2,663,654–2,663,657. To improve the quality of the facsimiles obtained in this manner it is known to provide a radiation filter or other infra-red transparent lamina between infra-red radiation source and the assembly of thermally sensitive copying sheet and overlay sheet. A filter which restricts the frequency range of radiation transmitted to the thermally sensitive sheet to wave lengths shorter than approximately 5 microns is disclosed in United States Patent 2,916,622. The filter therein disclosed comprises a sheet of polyethylene terephthalate resin of about three mils thickness. Other operable materials disclosed therein include fibrous and cellulosic materials such as paper. Other materials such as glassine and silk screen are also known for use in a similar manner. This invention discloses silicone-coated thermoplastic resin films as suitable and inexpensive overlay sheets for use in thermal copying processes. Such materials provide excellent infra-red transmission and excellent thermal insulation for the copying sheet and improve the quality of copies produced by thermal copying processes. It has been found that by coating polysiloxane resin on a sheet of material of thermoplastic composition which would otherwise be distorted by heat from the thermal copying process, an excellent overlay sheet is provided for use with thermal copying paper. The use of a coating material on the overlay sheet prevents the overlay sheet from being thermally embossed by heat conducted through the copying sheet from the infra-red absorbing indicia of the sheet being copied. Since thermoplastic materials can be rendered sufficiently plastomeric to resist creasing and wrinkling the materials of this invention may be used repeatedly until expended by wear and tear without lessened usability of the sheet because of loss of clarity and crazing in the manner of fibrous materials and cross-linked synthetic resins. In the absence of the coating material the thermoplastic sheet would be embossed after a short time because of localized heating adjacent the indicia being copied. The wrinkle resistant plastomeric quality of thermoplastic materials renders the sheets of this invention superior to polyester resin sheets and fibrous sheets which craze during use in thermal copying machines.

It is an object of this invention to provide a cover sheet for thermal copying paper for use in thermal copying machines.

It is another object of this invention to provide an inexpensive material for use with thermal copying paper which will not wrinkle or craze during use in a thermal copying machine.

It is another object of this invention to provide a de-staticized cover sheet for thermal copying paper.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

It has been found that synthetic resin sheets such as cellulose diacetate, cellulose triacetate, polystyrene, cellulose acetate butyrate, ethyl cellulose, vinylidene chloride, fluorinated vinyl resins, polypropylene, polyethylene, and similar thermoplasictic resins are suitable materials for use on thermal copying machines when the resin sheets are coated with silicone. Other materials such as regenerated cellulose and fibrous cellulosic materials such as paper which are plastomeric, and cross-linked resins, unless highly plasticized, are not improved in appreciable degree by silicone coating except that such materials as are easily charged with static electrical charge are operably destaticized by the coating. The silicone coating at the interface of the resin sheet and the copying paper provides a heat transfer barrier which protects the thermoplastic resin sheet from being thermally distorted and embossed by heat conducted from the indicia being copied. In addition, the silicone coating de-staticizes the sheet so that the thermal copying sheet and the overlay sheet can be easily separated. The absence of a static electric charge upon the surface of the sheet prevents dust and the like from adhering to the sheet and scratching the surface of the sheet. Without the silicone coating on the thermoplastic sheet, an image of the indicia would be embossed on the sheet by local overheating of the overlay sheet adjacent the indicia.

The application of a silicone coating on a synthetic resin sheet does not adversely affect either the infra-red transparency of the material or the heat-insulating quality of the material, and in addition renders the material substantially free of static electrical charge, so that the overlay sheet freely separates from the copying material. Silicone as used herein means any organopolysiloxane compound which is suitable for use as a coating material and particularly includes solvent solutions and aqueous emulsions of such material. Cellulose acetate as used herein means cellulose triacetate and deacetylated materials such as diacetate and materials comprising other than acetate esterification such as cellulose acetate butyrate.

Figure 1:
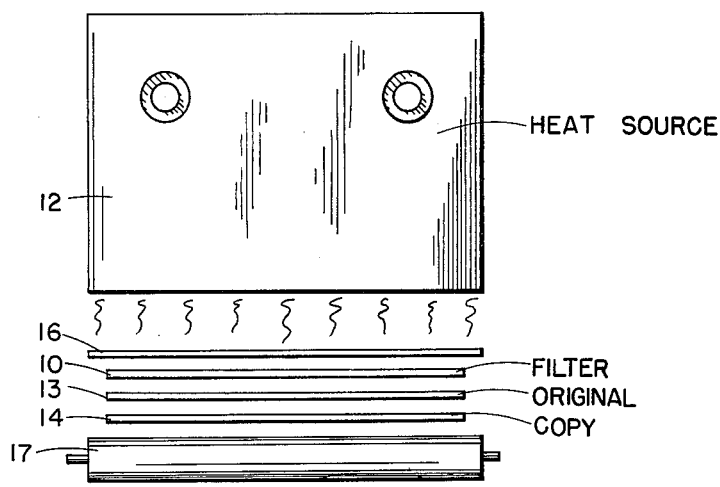
FIGURE 1 is a cross-sectional elevation of the material of this invention assembled for use in a copying machine.

In FIGURE 1 is shown thermoplastic sheet 10 coated on both surfaces with films of silicone material. The silicone may preferably be any polysiloxane resin as may be desired, the common properties of these resins being that they are extremely resistant to thermal distortion and that they render the surfaces on which they are coated substantially free of static electricity. The silicone coating provides heat insulation sufficient to prevent relief impression from being formed by thermal distortion on the thermoplastic sheet adjacent the indicia of the material being copied. Sheet 10 may be any of the prior-mentioned thermoplastic synthetic resins or may be other similar infra-red transparent thermoplastic resin. Such materials do not become set with permanent wrinkles as do cross-linked polyester resins, and other thermosetting or cross-linked resin films generally. The thermoplastics are therefore preferred materials because of the inherent property thereof of resisting creasing when folded and of re-forming into smooth film when heated, so as to eliminate any crease that may exist therein before heating. A preferred material for use therein is silicone-coated cellulose acetate of 2 mils or 3 mils thickness. Film of other thicknesses and compositions may also be used herein.

Figure 2:
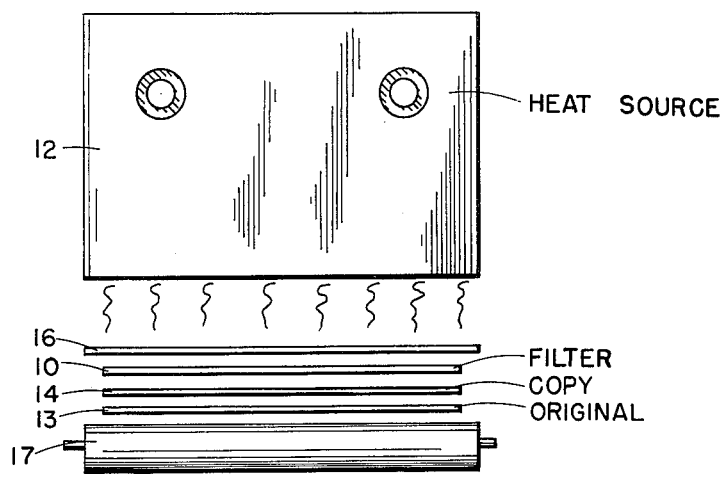
FIGURE 2 is a cross-sectional elevation of a modification of the material and process of FIGURE 1.

In FIGURE 2 silicone-coated sheet 10 is disposed between infra-red radiation source 12 and thermally sensitive copying sheet 14. Indicia-bearing sheet 13 is disposed beneath copying sheet 14. The assembly of sheets 10, 13 and 14 is compressed between infra-red transparent belt 16 and roll 17 and is carried by belt 16 past radiation source 12 in operable manner.

In FIGURE 1, sheets 10, 13 and 14 are shown in different arrangement with indicia-bearing sheet 13 disposed between coated sheet 10 and copying sheet 13. Either of the arrangements shown in FIGURES 1 and 2 may be used, it being necessary only that sheet 10 be disposed adjacent belt 16 to prevent heat from being conducted from the belt to copying sheet 13 and thereby prevent the entire surface of the copying sheet from being darkened. Sheet 10 may be coated with resin on only that side disposed nearest the indicia being copied. The use of a sheet 10 coated on only one side provides an article which is fully equivalent to a sheet which is coated on both sides; however, it is preferred to provide a sheet coated on both sides to enable the sheet to be used without the possibility of it being improperly assembled with the silicone-coated surface being placed uppermost.

The preferred materials in the article of this invention are thermoplastic resins which have good infra-red transmission properties and which have good optical clarity. Cellulose di-acetate or tri-acetate coated with silicone are exemplary materials. Other materials comprise silicone-coated infra-red transparent synthetic resin sheets generally. Non-plastomeric or cross-linked resins or fibrous materials such as regenerated cellulose, polyethylene terephthalate and paper are improved by being de-staticized with a silicone coating, but are not preferred materials herein because the non-plastomeric qualities of such materials do not prevent wrinkling thereof.

The following examples are illustrative of the invention, but are not to limit the invention.

*Example I*

An 8½ x 14-inch sheet of cellulose di-acetate 3 mils thick is coated on both sides by immersion in a solvent dispersion of polyamylsiloxane. The solvent dispersion is obtained by refluxing 60 grams monoamyl triethoxy silane, 30 grams acetic acid and 1 drop $H_2SO_4$ until diethyl acetate is formed and distilled off leaving a viscous liquid comprising a mixture of polyamylsiloxane which is taken up in trichloroethylene. The coated acetate sheet is heated to 140° F. for 60 minutes to provide a solid non-tacky polyamylsiloxane coating which is tough and strong. The dried sheet is then used as an overlay sheet in a thermal copying machine without crinkling of the sheet after repeated use.

*Example II*

50 grams dimethallyl silane is mixed with 50 grams water and 5 grams of 10 percent hydrochloric acid. The mixture is warmed and agitated for 70 minutes and neutralized and water is distilled off under reduced pressure to provide a viscous material. A sheet of cellulose triacetate of 1½ mils thickness is dipped in the material and is heated under reduced pressure to provide a solid coating comprising dimethallyl silandiol and polydiallyl siloxane. The coated sheet does not distort when used as a cover sheet in a thermal copying machine.

*Example III*

70 grams of di-isopropyl diethoxy silane is mixed with 60 grams propionic acid and 5 drops sulphuric acid and is heated until sufficient ethyl propionate is driven off to provide a viscous liquid. The liquid is neutralized with ammonia and mixed with 2 percent lead naphthenate as a drier. A polystyrene sheet 2 mils thick is dipped in the liquid and is cured at 140° F. for 50 minutes. The coated sheet does not wrinkle when used as a cover sheet for copying material in a thermal copying machine.

The article of this invention may comprise virtually any thermoplastic synthetic resin and preferably comprises resins which are transparent to radiation of infra-red and optical wave lengths and which are provided in sheets of from ½-mil to 5-mils thickness. Cellulose acetate is a preferred material for use herein because of its excellent transparency at wave lengths of from 1 to 5 microns, the transparency of such material being greater than 80% throughout most of that range. Other materials which provide excellent cover sheets when silicone coated include cellulose acetate butyrate, polystyrene and substantially uncrosslinked silicon resin films and polyester films, highly crosslinked resins are not suitable materials herein because of the inability of such materials to recover from thermal distortion.

While certain modifications and embodiments of the invention have been described, it is of course to be understood that there are a great number of variations which will suggest themselves to anyone familiar with the subject matter thereof, and it is to be distinctly understood that this invention should not be limited except by such limitations as are clearly imposed in the appended claim.

I claim:

The process of providing a de-staticized thermally sensitive facsimile copy of graphic indicia comprising the steps of positioning a radiation filter transparent to infra-red radiation between an infra-red radiation transparent conveying means and thermographic copy materials, said filter having an organopolysiloxane coating thereon positioned adjacent said copy materials, the presence of said coating on said filter acting to reduce heat transfer between said conveying means and said copy materials and to minimize electrostatic attraction between said filter and said copy materials, said copy materials comprising a graphic original in contact with a copy sheet having a heat-sensitive coating thereon; disposing an infra-red radiation source on one side of said conveying means and positioning said filter on the opposite side of said conveying means; and transporting said copy materials and said filter on said conveying means through an infra-red exposure zone to reproduce an image of said graphic original on said copy sheet.

References Cited by the Examiner

UNITED STATES PATENTS

| | | |
|---|---|---|
| 2,768,906 | 10/1956 | James. |
| 2,859,351 | 11/1958 | Clark et al. _____ 250—65 |
| 2,875,098 | 2/1959 | Blatz. |
| 2,880,110 | 3/1959 | Miller _____ 250—65 |
| 2,916,622 | 12/1959 | Nieset _____ 250—65 |

FOREIGN PATENTS

| | | |
|---|---|---|
| 504,450 | 7/1954 | Canada. |
| 317,936 | 8/1929 | Great Britain. |

RALPH G. NILSON, *Primary Examiner.*

UNITED STATES PATENT OFFICE
CERTIFICATE OF CORRECTION

Patent No. 3,219,819            November 23, 1965

Ernest B. Brewster

It is hereby certified that error appears in the above numbered patent requiring correction and that the said Letters Patent should read as corrected below.

Column 2, line 34, for "are plastomeric" read -- are not plastomeric --; column 3, line 67, for "coplying" read -- copying --; line 71, for "50 grams dimethallyl silane" read -- 50 grams dimethallyl diethoxy silane --.

Signed and sealed this 31st day of January 1967.

(SEAL)
Attest:

ERNEST W. SWIDER            EDWARD J. BRENNER
Attesting Officer            Commissioner of Patents